Feb. 2, 1954

H. W. MARANO 2,667,637

STAPLING MACHINE

Filed Feb. 15, 1949

Inventor,
Herbert W. Marano,
Benjamin Schlosser
Atty.

Feb. 2, 1954

H. W. MARANO

STAPLING MACHINE 2,667,637

Filed Feb. 15, 1949

H. W. MARANO 2,667,637

STAPLING MACHINE

Filed Feb. 15, 1949

Inventor
Herbert W. Marano
Benjamin Schlosser
Atty.

Feb. 2, 1954     H. W. MARANO     2,667,637
STAPLING MACHINE Filed Feb. 15, 1949     8 Sheets-Sheet 7

Inventor
Herbert W. Marano
Benjamin Schlosser
Atty.

Patented Feb. 2, 1954

2,667,637

UNITED STATES PATENT OFFICE 2,667,637

STAPLING MACHINE

Herbert W. Marano, Brooklyn, N. Y., assignor to Wilson-Jones Company, Chicago, Ill., a corporation of Massachusetts Application February 15, 1949, Serial No. 76,497

27 Claims. (Cl. 1—3)

This invention relates to a stapling machine for securing together sheets of paper or similar material and for driving staples into boards without bending the legs of the staples to tack any desired material to the board.

One of the objects of the present invention is to provide improved means for supporting the legs of staples against collapse in any direction during the staple driving operation, and thereby to increase the driving power of the stapling machine.

Another object of this invention is to provide a simple and efficient stroke control mechanism that will eliminate jamming or clogging of the stapling machine by preventing a second staple from moving into the exit channel until after the preceding staple has been cleared therefrom.

It is another object of the invention to provide simple and efficient means for selectively positioning either of two clinching surfaces in alignment with the exit channel so that the type of stapling, either permanent or temporary, may be regulated or changed with ease.

Another object of the invention is to provide improved friction means for permitting shifting the stapling machine between stapling and tacking operations with speed and convenience. It is also within the scope of this objective to provide improved means for automatically regulating the distance between the base and the top of the machine whenever the machine is shifted from tacking position to stapling position.

Another object of the invention is to provide simple and efficient means for loading the stapling machine, feeding the staples towards the exit channel, and removing staples from the machine.

Another object of the invention is to provide simple and efficient means for securing cushioning pads to the base of the stapling machine that will securely hold the pads in position.

Other objects of the invention will become apparent upon reading the following description, taken in conjunction with the accompanying drawings, in which.

Figure 1:
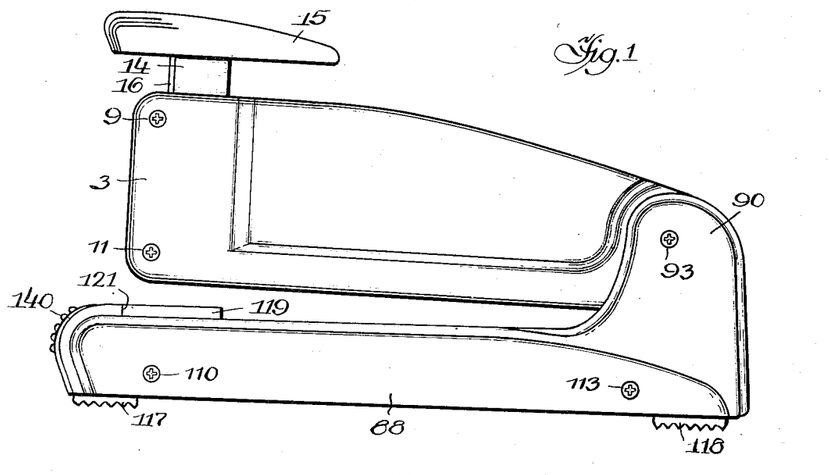
Figure 1 is a side elevation of a stapling machine embodying the invention.
Figure 2:
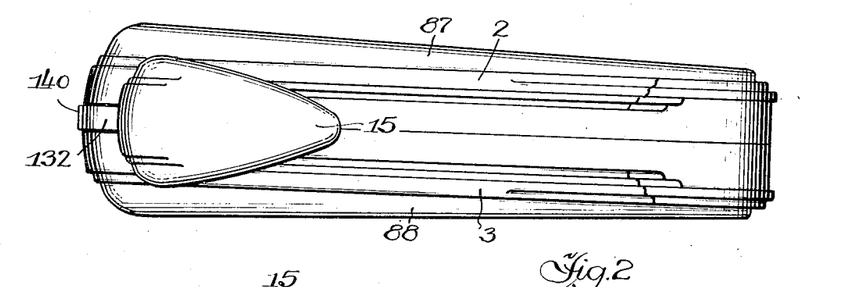
Figure 2 is a top elevation of the stapling machine.
Figure 3:
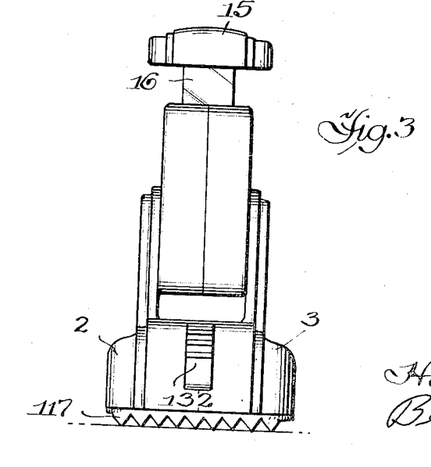
Figure 3 is a front elevation of the stapling machine.
Figure 4:
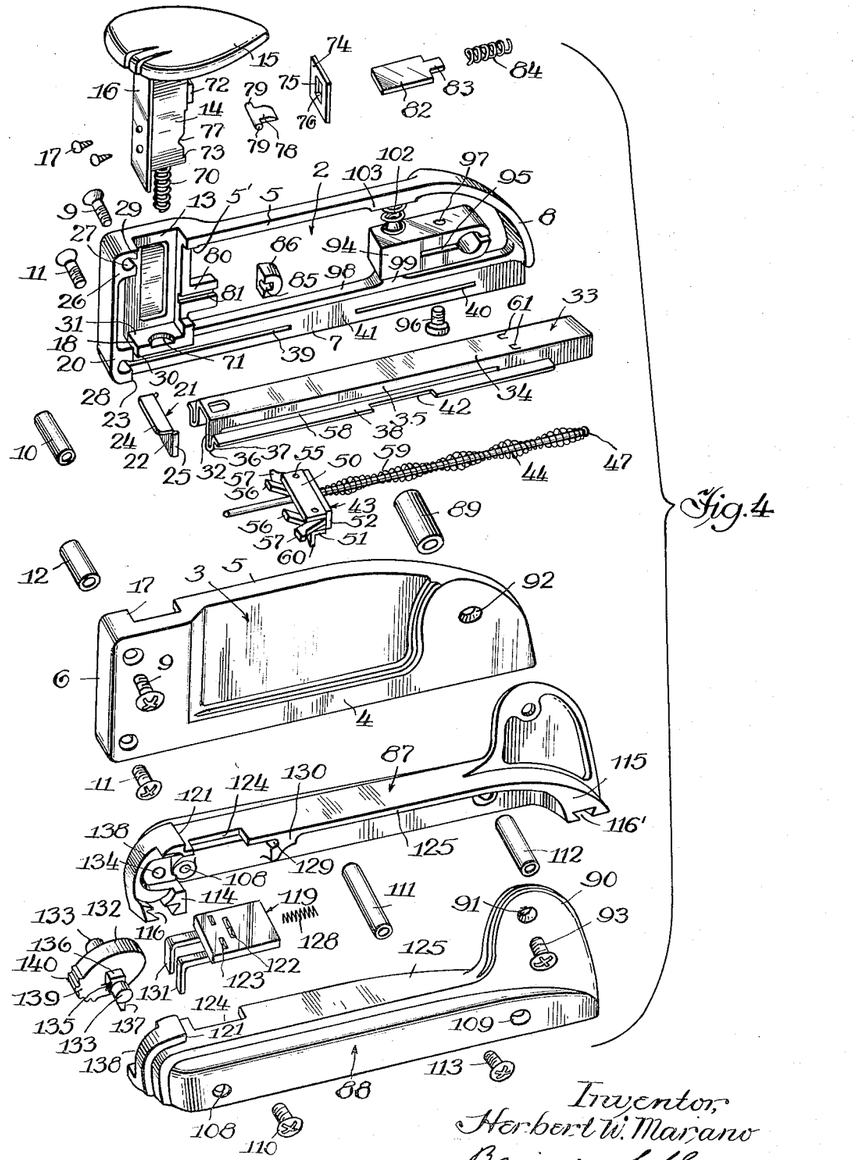
Figure 4 is an exploded view showing all the parts of the stapling machine in approximately the relationships they have in the assembled machine.

In the drawings, the reference numerals 2 and 3 indicate a pair of complementary body sections which are duplicates except that one is a left and the other a right. These sections may be cast or molded of aluminum or plastic, or may be formed in any suitable manner from steel or cast iron. As shown in Figure 4, each body section has a side wall 4 provided with a continuous flange extending at right angles from its periphery to form a top wall 5, front wall 6, bottom wall 7 and rear wall 8. The rear wall is curved to provide an attractive streamline shape for the rear of the stapling machine. Sections 2 and 3 fit together to form the body portion of the stapling machine and are secured together at their front end by screws 9 which are threaded into a sleeve 10 and screws 11 which are threaded into a sleeve 12. The top wall of each body section extends towards the other body section a distance equal to half the width of the stapling machine to provide a closed top.

The top wall 5 is recessed, as indicated at 13, to form a passageway for the vertical reciprocation of a ram 14. The ram may be made of the same material as the body portion, and has a head 15 which may be integral with the ram or may be rigidly secured thereto in any suitable manner. A driving blade 16, of spring steel, is secured to the front surface of the ram by means of a plurality of screws 17. The lower edge of the driving blade extends below the bottom of the ram and is positioned directly above the exit channel 18. The thickness of the driving blade is equal to the thickness of the wire staple 19 which it drives through the exit channel.

The bottom front corner is thickened, as indicated at 20. A supporting bracket 21 (Figures 4, 5 and 6), made preferably of hardened steel, is provided with a vertical plate 22 which is positioned against the rear edge 23 of corner portion 20 to form the front wall of exit channel 18. Bracket 21 has a horizontally extending lip 24 fitting over the top edge of corner portion 20. The vertical edges 25 of the plate 21 (Figure 4) are bent rearwardly to project into the exit channel a distance equal to the thickness of the wire staples 19. The relationship between the supporting bracket, its vertical edges and the staples is shown more clearly in Figure 10. The rearwardly extending projections at the vertical edges of plate 21 may be formed in any suitable manner. Regardless of how they are formed, the projections extend rearwardly a distance equal to the thickness of the wire staples, and the lateral distance between the rearwardly extending projections is equal to the overall width of the staples.

The upper front corner portion 26 is shaped similar to bottom front corner portion 20. Transverse apertures 27 and 28 extend through top and bottom corner portions, respectively, to form snugly fitting housings for sleeves 10 and 12. The apertures 27 and 28 break through the rear edges 29 and 23 of the thickened corner portions so that sleeve 10 engages the upper front surface of driving blade 16 and sleeve 12 engages the front surface of vertical plate 22. The sleeves 10 and 12 serve as thrust bearings to prevent movement of either blade 16 or bracket 21 in a forward direction. Both sleeves 10 and 12 are made of hardened steel to provide suitable wearing surfaces. Screws 9 and 11 hold the sleeves so tightly that they cannot rotate, but whenever either of them becomes worn its holding screws may be loosened, and the worn sleeve may be rotated manually to present a new wearing surface. The sleeves may be square or rectangular in cross section, but the round shape illustrated is preferred because of the multiplicity of wearing surfaces which may be provided. Obviously, if either sleeve becomes worn around its entire circumference, it may be replaced.

The rear wall of the exit channel 18 is formed partly by the front edge 30 of a horizontal block 31 extending inwardly from the side wall 4 a short distance above the bottom of the body portion, and partly by the front edge 32 of a staple support slide 33. The staple support slide comprises a top wall 34 and a pair of downwardly extending side walls 35 which are straddled by the legs of the wire staples. The side walls are each bent outwardly, as indicated at 36, upwardly, as indicated at 37, and then outwardly to form horizontal flanges 38. The front edge 32 is positioned close enough to projections 25 to cause portions 36 to contact the rear edge of the projections. Accordingly, after the foremost staple has been moved off the front end of the staple slide into the exit channel the front edges of side walls 35 engage the rear surface of the top part of the staple at two laterally spaced points near the legs of the staple and the portions 36 engage the back surface of the legs of the staple. Since the vertical plate 22 engages the entire front surface of the staple and the projections 25 engage the outside surfaces of each leg of the staple, the legs of the staple being driven through the exit channel are provided with the maximum possible support to prevent collapse in the exit channel. Since collapse of a staple in the exit channel might cause the stapling machine to jam, the method of supporting the staple during the staple driving operation eliminates one possible source of trouble.

The staple support slide 33 is held between side sections 2 and 3 by a pair of horizontally extending recesses 39 and 40 into which the horizontal flanges 38 fit. The space 41 between recesses 39 and 40 is equal in length to a recess 42 formed in each flange 38 to position the staple support slide so that its front edge 32 abuts the rear edge of projections 25 on the supporting bracket 21. The interengagement of the space 41 and recess 42 prevents any longitudinal shifting of the staple support slide.

Figures 5, 30, 31:
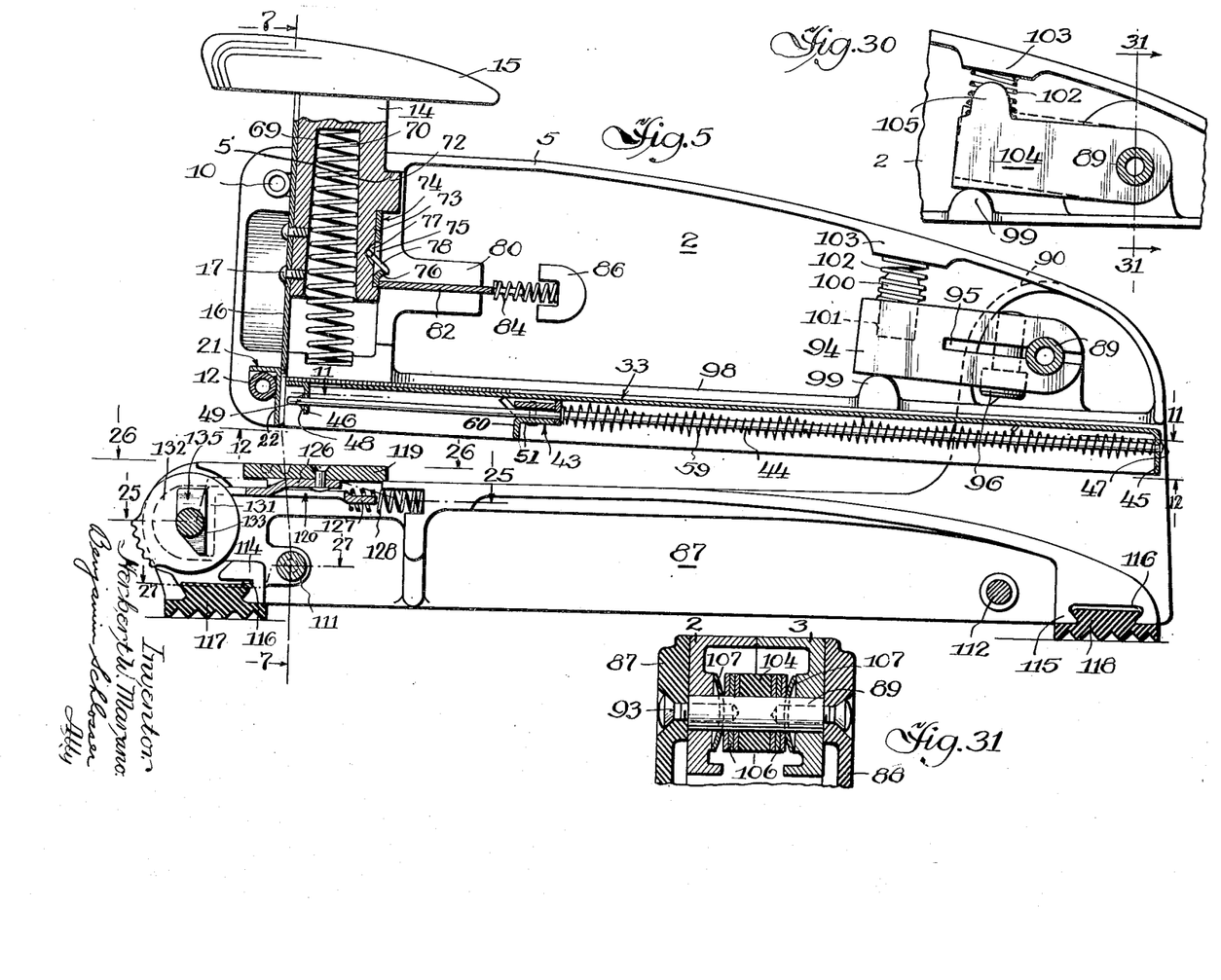
Figure 5 is a longitudinal sectional view through the stapling machine showing the parts in the positions occupied before the start of a staple driving operation.
Figure 30 is a fragmentary side elevation showing a modified embodiment of the friction block.
Figure 31 is a cross sectional view, taken along the line 31—31 of Figure 30.
Figures 11, 12, 13, 14, 15, 16:
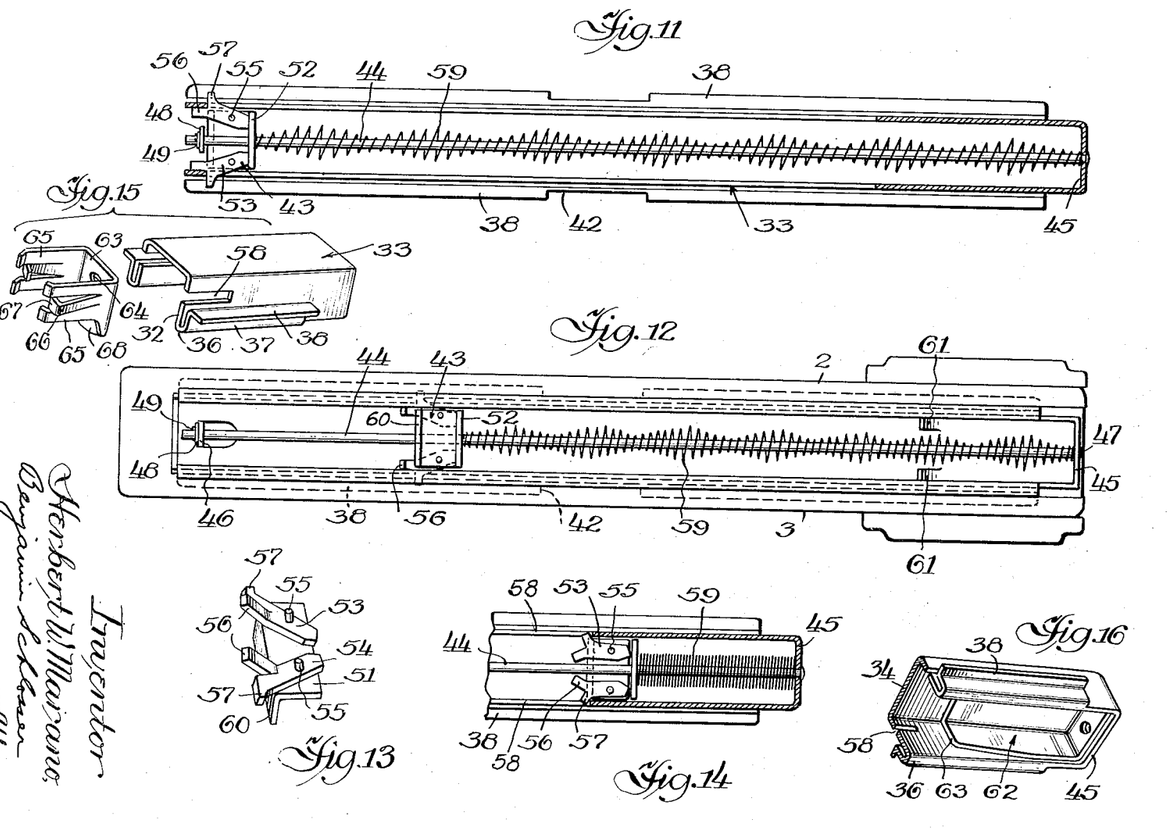
Figure 11 is a longitudinal sectional view, taken along the line 11—11 of Figure 5.
Figure 12 is a longitudinal sectional view, taken along the line 12—12 of Figure 5.
Figure 13 is a detail perspective view of the reset plate and feed fingers showing the method of securing the feed fingers in place.
Figure 14 is a fragmentary longitudinal sectional view showing the feed fingers collapsed by pressure against the ends of the slots in the side walls of the staple support slide.
Figure 15 is a detail perspective view of a modified form of feed mechanism shown in association with the rear portion of the staple support slide.
Figure 16 is a fragmentary perspective of the rear portion of a modified form of staple support slide showing stop means for limiting the rearward movement of the feed mechanism.
Figure 17:
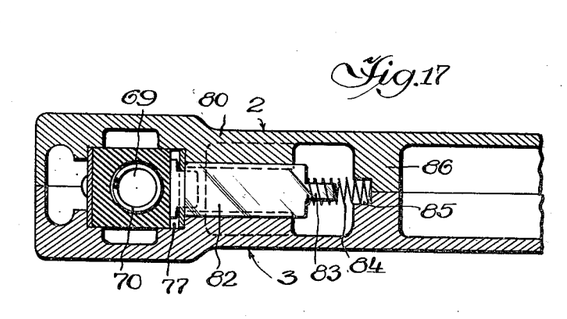
Figure 17 is a longitudinal sectional view, taken along the line 17—17 of Figure 6.

A feed plate 43 is slidably mounted on a guide rod 44 inside the staple support slide 33. As shown in Figures 5 and 12, the guide rod is secured in the staple support slide by being projected through apertures in the end wall 45 of the staple support slide and a lip 46 struck downwardly from the top wall 34. The end of guide rod 44 adjacent end wall 45 is headed, as indicated at 47, and the opposite end is held by a washer 48 against which a portion of the rod is upset, as indicated at 49.

The feed plate 43 comprises a finger plate 50, a reset plate 51, a pressure plate 52, and a pair of feed fingers 53 and 54 pivotally mounted between finger plate 50 and reset plate 51 by means of pivot pins 55. As shown in Figure 13, feed fingers 53 and 54 are duplicates except that they are reversed. One portion 56 of each feed finger extends upwardly and one portion 57 extends outwardly. The side walls 35 of the staple support slide are each provided with a longitudinally extending slot 58 which stops a distance from the end wall 45. The portions 57 of the feed fingers 53 and 54 normally project through the slots 58. The rear ends of the feed fingers project slightly beyond the rear edge of reset plate 51 and pressure plate 52, which is forced against the rear edges of finger plate 50 and reset plate 51 by a barrel spring 59 encircling guide rod 44, urges the feed fingers outwardly. The upwardly extending portions 56 engage the inside surface of each side wall 35 to limit the outward movement of the feed fingers. Instead of bifurcating the ends of the feed fingers to bend the portions 56 upwardly, the same result may be attained by forming an upstanding projection on the feed fingers in any conventional manner.

The outwardly extending portions 57 of the feed fingers normally engage the rear surface of the rearmost staple, and the pressure of spring 59 urges the clip of staples forwardly to position the foremost staple in the exit channel 18 under driving blade 16. The reset plate 51 has a downwardly extending lip 60 which may be engaged by the user's finger to move the feed plate rearwardly against the action of spring 59.

In loading the stapling machine, the base portion is swung pivotally relative to the body portion in order to make the lip 60 of reset plate 51 accessible to the user's finger. The clip of staples is then positioned on the staple support slide 33 and the machine is held with the front end downwardly at a vertical angle steep enough to allow the staples to slide downwardly by gravity. When the machine requires loading, the feed fingers 53 and 54, which are spring pressed to hold them against the rearmost staple, are positioned near the front of the machine. The staples are placed on the staple support slide 33, with their legs straddling the side walls 35, and slide downwardly by gravity until they engage the rear side of projections 57 on feed fingers 53 and 54. The lip 60 of the reset plate is then engaged by the user's finger and moved rearwardly against the action of the spring 59. The rear end of the clip of staples is held against movement off the end of the staple support slide by thumb pressure, and the feed fingers 53 and 54 collapse inwardly when the rear side of the projections 57 are pressed against the legs of the staples. The reset plate is pushed rearwardly until the feed fingers pass the end of slot 58. In this position the feed fingers are held in their collapsed position by the side walls 35 of the staple support slide 33, and the staples then slide downwardly to the front end of the machine by gravity. Removal of the user's finger from the reset plate allows spring 59 to move the feed plate forwardly against the rear of the rearmost staple so that the foremost staple is held in the exit channel 18 by positive pressure.

Of course, it is possible to load the stapling machine by moving the reset plate back before inserting the clip of staples but the method first described is preferred because it is not necessary to hold the reset plate in its rearmost position. As soon as the feed fingers are collapsed the clip of staples drops into working position and the reset plate may be released almost simultaneously with the collapse of the feed fingers. If it is ever desired to remove a clip of staples from the staple slide, it is necessary only to hold the stapling machine approximately vertically, with the front end uppermost, and move the feed plate downwardly until the feed fingers collapse against the ends of slots 58 when the staples will fall freely out of the machine.

A pair of lips 61 is struck downwardly from the top wall 34 rearwardly of the end of slot 58 to stop the rearward movement of the feed plate after the feed fingers have been collapsed into the interior of the staple slide. In Figure 16 a modified embodiment of the stop means is shown, wherein a short channel shaped member 62 is substituted for the lips 61. The feed plate 43 abuts the edge 63 of member 62 to limit its rearward movement.

A modified embodiment of the feed plate is shown in Figure 15. In this form the feed plate is an integral structure of a rear wall 63 apertured, as indicated at 64, to fit on guide rod 44. Side walls 65 extending forwardly of rear wall 63 each have a feed finger 66 projecting laterally therefrom. The forward extremity of each finger 66 is bent inwardly at right angles to side walls 65, as indicated at 67, to provide a surface adapted to engage the rear surface of the rearmost staple to force the staples forwardly. The fingers 66 are narrow enough to project through slots 58 and are resilient enough to be collapsed against the ends of the slots. As in the case of the embodiment previously described, the fingers 66 will collapse against the pressure from the legs of the staples when the feed plate is moved rearwardly and the rear end of the clip of staples is held against movement off the end of the staple support slide by thumb pressure. The rear wall 63 is extended downwardly to provide a portion 68 which may be engaged by the user's finger in the same manner as the downturned lip 60 on reset plate 51.

The stroke control mechanism which prevents a second staple from entering the exit channel 18 before the preceding staple has been driven from the machine is shown in Figures 4, 5, and 17 to 23, inclusive. The ram 14 is provided with a centrally located recess 69 in which a coiled compression spring 70 is housed. The bottom of spring 70 is seated in a recess 71, half of which is formed in the top surface of each block 31. When the ram 14 is pushed downwardly a complete stroke to drive a staple from the exit channel, the spring 70 returns the ram to its starting position as soon as the downward pressure is released. As will be hereinafter described, the stroke control mechanism prevents the return of the ram to its starting position after the downward stroke has been started until after it has been completed. A projection 72, which is preferably integral with the rear surface of the ram, engages the abutment 5' on the underside of top wall 5 to limit the upward movement of the ram.

Directly below projection 72 (Figures 4 and 5), a flat recess 73 forms a seat for a stop plate 74 which is secured therein in any suitable manner. The stop plate is preferably made of hardened steel, and is provided with an aperture 75 from the lower edge of which a lip 76 projects upwardly and rearwardly. A semi-cylindrical recess 77 extends into the rear surface of the ram from the base of recess 73. The recess 77 extends transversely of the rear surface of the ram and is aligned with the aperture 75 in stop plate 74. A shield 78 preferably of hardened steel, extends through aperture 75 and has a pair of laterally projecting ears 79 seated in the recess 77 behind stop plate 74 to pivot the shield so that it may be swung between a position where it covers the lip 76 and a position against the upper edge of aperture 75.

Each of the side walls 4 has an inwardly extending projection 80 positioned adjacent the rear of the channel 13 in which ram 14 is reciprocated. The projections 80 are preferably integral with the body sections 2 and 3. Each projection 80 has a longitudinally extending recess 81 adapted to seat one edge of a latch 82. The latch is made preferably of hardened steel, and is provided with a narrow tail portion 83 which is encircled by one end of a compression spring 84. The other end of the spring 84 seats in a recess 85, one half of which is formed in a block 86 projecting inwardly from each side wall 4. The recess 85 is aligned horizontally with recesses 81.

Figure 18:
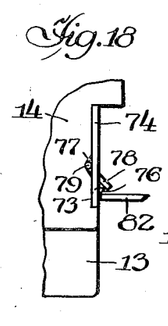
Figure 18 is a fragmentary diagrammatic view of the stroke control mechanism showing the ram, stop member, spring-pressed latch, and shield in the positions occupied before the start of a staple driving operation.

In normal position, as shown in Figures 5 and 18, the latch 82 is held in a horizontal position with its sides confined in the recesses 81 and its front end urged against the rear of ram 14 by the spring 84. The position of the ram is such that the end of latch 82 engages the lower portion of stop plate 74 just below lip 76. In this position, the outer edge of shield 78 projects slightly beyond the outer edge of lip 76. Looking at the front end of the body portion, as shown in Figure 5, the driving blade 16 has its lower edge positioned at the top of the exit channel and the foremost staple is positioned in the exit channel just below the driving blade.

Figure 19:
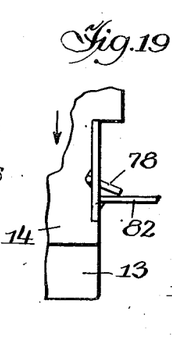
Figure 19 is a view, similar to Figure 18, showing the parts after the start of the downward stroke of the ram.
Figure 20:
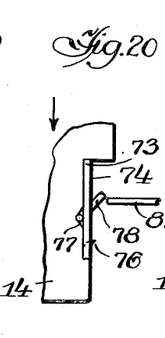
Figure 20 is a view, similar to Figure 18, showing the parts just before the completion of the downward stroke of the ram.

In order to drive the foremost staple from the machine the head 15 of ram 14 is pressed or struck downwardly. As ram 14 is moved downwardly, driving blade 16 engages staple 19 and moves it downwardly through the exit channel, and lip 76 moves downwardly past latch 82, pushing the latch outwardly against the action of spring 84. As shown in Figures 19 and 20, the end of latch 82 engages the outer end of shield 78 and lifts it about its pivot. As soon as latch 82 rides over lip 76, the spring 84 moves it forwardly into engagement with the surface of the stop plate 74. This position is illustrated in Figure 19.

At the point shown in Figure 19 the lip 76 is in operative position to prevent upward movement of the ram past this point and the driving blade 16 is positioned in the exit channel below the top of the clip of staples so that it is impossible for a second staple to move into the exit channel. From this point continued downward movement of the ram causes the latch to move shield 78 upwardly about its pivot until the pivotal movement of the shield is stopped by the engagement of the shield with the upper edge of aperture 75. The shield is then in the position shown in Figure 20 and continued downward movement of the ram causes the latch to move outwardly until it also reaches the position shown in Figure 20. At this point the staple being driven through the exit channel has reached a plane below the bottom of the clip of staples on staple support slide 33 but has not yet been driven out of the exit channel.

If downward movement of the ram is stopped at this point and the ram were lifted upwardly, the lip 76 would engage latch 82 to stop upward movement of the ram before driving blade 16 would be lifted far enough to clear the top of the clip of staples. Accordingly it is necessary to complete the downward stroke of the ram and actually move the staple out of the exit channel before a second staple can be moved into the exit channel.

Figure 21:
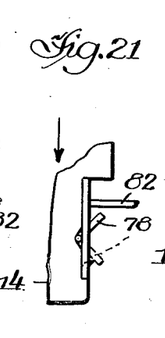
Figure 21 is a view, similar to Figure 18, showing the parts after the completion of the downward stroke of the ram and before the start of its upward movement.
Figures 22, 23:
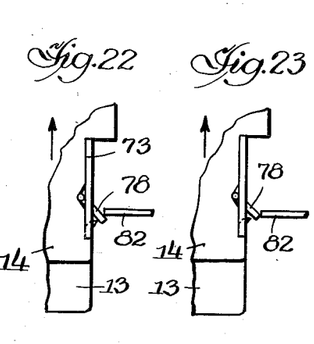
Figure 22 is a view, similar to Figure 18, showing the parts approaching the completion of the upward movement of the ram.
Figure 23 is a view, similar to Figure 18, showing the parts just before the completion of the upward stroke of the ram.
Figure 24:
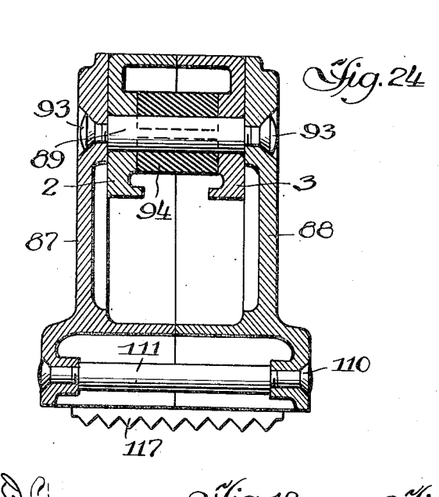
Figure 24 is a cross sectional view, taken along the line 24—24 of Figure 6.

Referring to Figure 21, it will be seen that continued downward movement of the ram from the position shown in Figure 20, in addition to driving the staple out of the exit channel, will cause latch 82 to ride over the end of shield 78 and release it so that the shield will fall downwardly about its pivot to the position shown in dotted lines in Figure 21. If the staple is held upside down, as it may be for tacking operations sometimes, so that the shield can not fall by gravity into the dotted line position of Figure 21, the latch 82 will force the shield into shielding position during the first part of the upward stroke of the ram. When the downward stroke of the ram has been completed and shield 78 has moved to the position shown in dotted lines in Figure 21 and in solid lines in Figures 22 and 23, upward movement of the ram will be effected by spring 70, and shield 78 will act as a cam to force latch 82 outwardly past lip 76 until the ram reaches its normal position and the latch, shield and lip are again in the position illustrated in Figure 18. As soon as driving blade 16 moves upwardly past the level of the clip of staples, as it does when the ram reaches its normal position, spring 59 moves feed plate 43 forwardly to force the next staple into the exit channel under driving blade 16 and all parts of the machine are ready for the next staple driving operation.

A base portion comprising two sections 87 and 88 is pivoted to the body portion by means of a hinge pin 89. The sections 87 and 88 are duplicates except that they are reversed. Each base section has an integral upstanding fin 90 provided with an aperture 91 aligned with similar apertures 92 in body sections 2 and 3 when the stapling machine is assembled. A pair of screws 93 passing through apertures 91 and 92 are threaded into the ends of hinge pin 89 to hold the base and body portions together.

A friction block 94 is mounted between body sections 2 and 3 on hinge pin 89. The friction block is split from one end, as indicated at 95, and a screw 96 is threaded into an aperture 97 traversing the block through the split 95 to regulate the friction between block 94 and hinge pin 89. The screw 96 holds the split end of the friction block against the hinge pin 89 tightly enough so that when the body portion of the stapling machine is moved downwardly against the base, as in the normal stapling operation, the friction block remains fixed relative to the hinge pin. The screw 96 is adjusted so that the friction block is held against turning by a force greater than the force exerted by spring 102. The friction is preferably regulated so that the base and body portions may be readily moved about the hinge pin 89 and will stay in any angular relationship to which they are moved, except that, as hereinafter described, a minimum distance will always be maintained between the front ends of the body and base so that there is always sufficient room to position the sheets to be stapled together. This maintenance of the angular relationship between the base and body portions is of particular importance when the machine is to be loaded and when it is to be used for tacking purposes.

Each body section 2 and 3 is provided with a longitudinally extending ledge 93 which lies a distance above slots 39 and 40 sufficient to permit the staple support slide 33 to fit thereunder with sufficient clearance for the staples 19 and extends from the rear edge of block 31 to the back wall 8. A projection 99 extends upwardly from ledge 98 to abut the underside of friction block 94 and prevents the friction block from moving downwardly relative to the body portion. The projection 99 acts as a spacer to keep the friction block 94 a predetermined distance from the bottom of the body portion. If desired, the projection could extend downwardly from the bottom of block 94 to engage the bottom of the body portion.

A projection 100 extends upwardly from the upper surface of friction block 94. This projection may be integral with the block, but is preferably a pin driven into a recess 101 in the block, as shown in Figure 5. A coiled compression spring 102 encircles projection 100 and one end of the spring bears against the top of friction block 94. The spring 102 could be seated in a recess in the top of friction block 94, if desired, but the projection 100 is preferred because it eliminates any possibility of accidental displacement of the spring. A boss 103 depends from the top wall 5 in vertical alignment with the projection 100 and is recessed to seat the other end of spring 102. The top of projection 100 is spaced below the boss 103 and the force exerted by spring 102 is sufficient to keep the bottom of friction block 94 normally in contact with the top of projection 99. If desired, projection 100 could be made integral with top wall 5 and one end of spring 102 be seated in a recess in the top of block 94.

Figure 6:
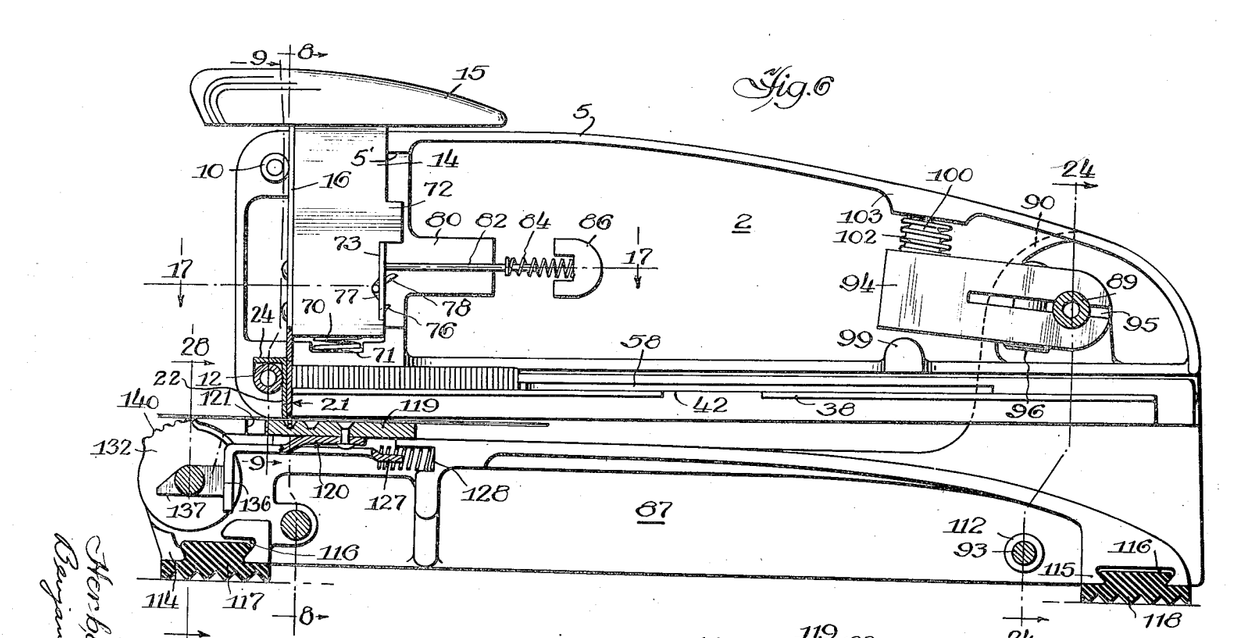
Figure 6 is a view similar to Figure 5, showing the parts in the position occupied at the finish of a staple driving operation.
Figures 7, 10:
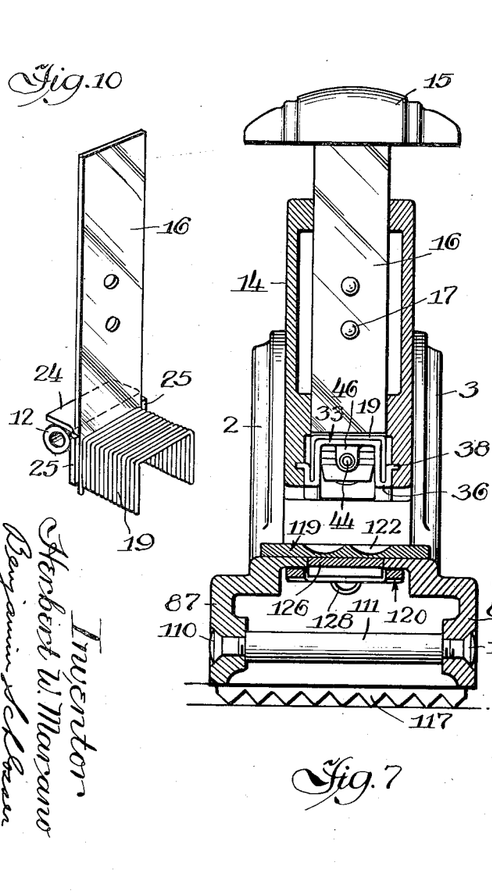
Figure 7 is a cross sectional view, taken along the line 7—7 of Figure 5.
Figure 10 is a detail perspective view showing the driving blade, supporting bracket, thrust bearing, and a plurality of staples in the relative positions occupied before the start of the staple driving operation.

When ram 14 is moved downwardly to drive a staple the body portion is moved downwardly about the pivot 89 until the front end of the body portion contacts the sheets positioned on the base portion which are to be stapled together. During this movement the friction block remains stationary and spring 102 is compressed, as shown in Figure 6. As soon as the ram is released spring 102 forces the body portion up until projection 99 again engages the bottom of friction block 94. When the stapling machine is to be loaded the body portion must be moved pivotally relative to the base portion a distance considerably greater than the distance between the top of projection 100 and the bottom of boss 103. The friction of the block 94 against hinge pin 89 must be light enough to permit projection 99 to move the friction block around hinge pin 89 without requiring excessive force, and yet must be sufficient to hold the friction block in any position relative to the hinge pin to which it is moved. After the base and body portions are moved about the pivot 89 for loading the machine or for tacking, the user generally swings the base and body back to the position shown in Figure 6. Spring 102 will then automatically move the body portion upwardly about the pivot, as hereinabove described, to maintain a minimum separation between the front of the body and the base portion.

Since the only leeway the body portion has relative to the friction block 94 is the space between the top of projection 100 and the bottom of boss 103, it is obvious that any movement between the base and body portion, beyond the movement permitted by this space, necessitates pivotal movement of friction block 94 around hinge pin 89. Accordingly, the friction between block 94 and hinge pin 89, which is regulated by screw 96, is of critical importance in the functioning of the stapling machine. Screw 96 is tightened enough to provide sufficient friction to hold the body portion in any angular position, relative to the base portion to which it is moved, subject, of course, to the minimum separation between the front end of the body portion and the base portion mentioned above. The friction is light enough, however, to permit pivotal movement of the body portion around the hinge sleeve without requiring an excessive amount of force.

Figures 30 and 31 show a modified form of friction means which may be substituted for friction block 94. In this embodiment the hinge pin 89 is drive fitted in an aperture in an arm 104. The arm 104 is provided with a lateral projection 105 which fits into spring 102 in the same manner as projection 100. A plurality of flat washers 106 is mounted on hinge pin 89 on either side of arm 104. A pair of cupped washers 107 is mounted on the ends of hinge pin 89 between the outermost flat washer and side walls 4 of the body portion. Screws 93 can be tightened in the ends of hinge pin 89 to flatten out the cupped washers 107 to exert lateral pressure against the flat sides of arm 104. The friction exerted against the sides of the arm 104 by the pressure of the washers 107 is so regulated that when the body portion of the stapling machine is moved pivotally around the hinge pin 89 the angular relationship between the body and base portions will be maintained by the friction against arm 104, subject, as in case of the friction block 94, to the minimum separation between the front end of the body and base portions. The drive fit of hinge pin 89 with the arm 104 secures these two members rigidly together so that the hinge pin is retained in a fixed position.

The base sections 87 and 88 are each provided with an aperture 108 near its front end and an aperture 109 near its rear end. The front end of the base is secured by means of a pair of screws 110 threaded into opposite ends of a front base pin 111 positioned between the apertures 108. A rear base pin 112 positioned between apertures 109 has a pair of screws 113 threaded into its ends. Both base sections are provided with thickened portions 114 and 115 adjacent the front and rear respectively. A dove tailed recess 116 in portion 114 has a dove tailed cushioning pad 117 of rubber or similar material interfitted therewith. A similar pad 118 is positioned in a dove tailed recess 116' in the rear portion 115.

Figure 8:
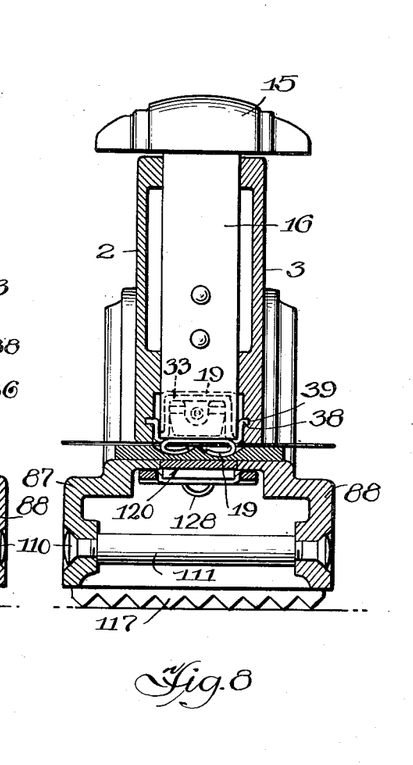
Figure 8 is a cross sectional view, taken along the line 8—8 of Figure 6.
Figure 9:
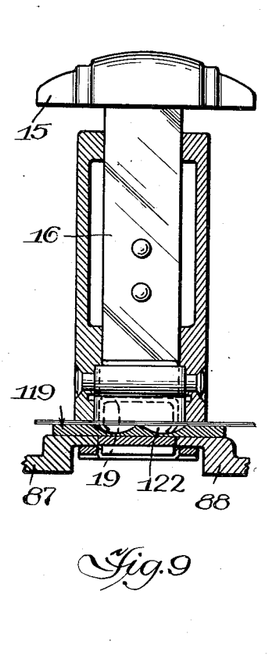
Figure 9 is a cross sectional view, taken substantially along the line 9—9 of Figure 6, but showing the parts at the start of the staple bending operation.

An anvil 119, made of hardened steel, is secured to a yoke 120 in any suitable manner, as by riveting or welding. The front edges of the base sections 87 and 88 are each provided with an upstanding ledge 121 of the same height as the height of the anvil, and the front edge of the anvil abuts the ledge 121 when the anvil is in its foremost position. The top of the anvil is provided with two different clinching surfaces 122 and 123. Clinching surface 122 comprises two cavities adjacent each other with the outer edges of each cavity laterally aligned with the ends of the exit channel 18 so that when a staple 19 is driven from the exit channel into clinching surface 122 the legs of the staple are bent inwardly, as shown in Figures 9 and 8 to staple the sheets together permanently. The cavities of surface 122 are rounded so that the ends of the staple legs are curved upwardly so that they will not stick in the fingers of persons handling the stapled papers.

Clinching surface 123 comprises two separated cavities having their inner edges laterally aligned with the ends of exit channel 18 so that when a staple is driven from the exit channel in clinching surface 123 the legs of the staple are bent outwardly to form a temporary fastening for the sheets through which the staple is driven.

Figure 25:
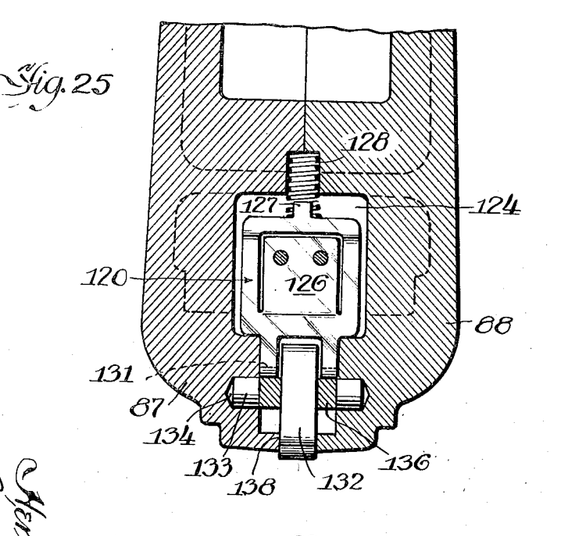
Figure 25 is a longitudinal sectional view, taken along the line 25—25 of Figure 5.
Figure 26:
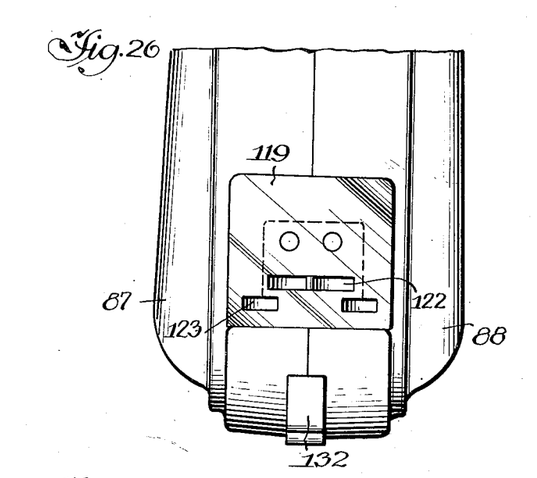
Figure 26 is a fragmentary top elevation of the front portion of the base portion of the stapling machine, taken along the line 26—26 of Figure 5, and showing the anvil and anvil positioning wheel.
Figure 27:
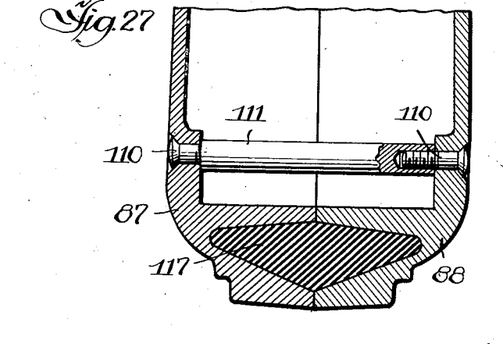
Figure 27 is a longitudinal sectional view, taken along the line 27—27 of Figure 5.
Figure 28:
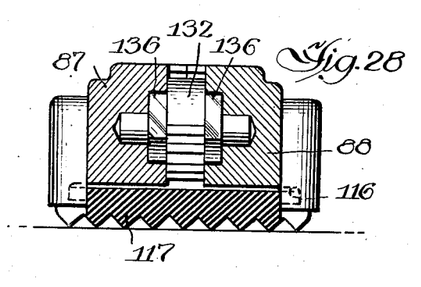
Figure 28 is a cross sectional view, taken along the line 28—28 of Figure 6.

As shown in Figure 4, a recess 124 is formed in the top wall 125 of the base portion directly below anvil 119. The yoke 120 has a flat plate 126 struck from its central portion, as shown in Figure 25, and offset upwardly to fit in the recess 124. A tail portion 127 extending from the rear of yoke 120 is encircled by a coiled compression spring 128 the other end of which is seated in a recess 129 formed in a ledge 130 integral with the base sections 87 and 88. The spring 128 bears against the rear edge of yoke 120 to urge it forwardly. The front portion of yoke 120 is bifurcated and bent downwardly to form two legs 131 which straddle a wheel 132 mounted to rotate in a vertical plane in front of the anvil. The shaft 133 on which wheel 132 is mounted seats in recesses 134 formed in base sections 87 and 88 just forwardly of apertures 108.

A projection or stop member 135 rigidly secured to each side of wheel 132 engages the front of legs 131 to limit the forward movement of yoke 120. The edge of projection 135 which acts as a cam surface may be of any suitable shape. The essential requirement is that the difference between the distances of cam surfaces 136 and 137 from the shaft 133 must equal the lineal distance between clinching surfaces 122 and 123. The cam surfaces are shaped so that the yoke will always be in either of two predetermined positions. When cam surface 136 engages legs 131, temporary clinching surface 123 is aligned vertically with exit channel 18, and when wheel 132 is rotated the spring 128 moves yoke 120 forwardly until legs 131 engage cam surface 137 and the permanent clinching surface 122 is vertically aligned with the exit channel.

The front of each base section 87 and 88 is recessed, as shown at 138, Figure 4, and wheel 132 is provided with a circumferential projection 139 which extends through the opening formed by the recesses. This projection portion 139 is knurled, as indicated at 140, to facilitate rotation of the wheel. The projection 139 engages the ends of recesses 138 to limit its rotation to the distance necessary to move from the position where cam surface 136 engages legs 131 to the position where cam surface 137 engages legs 131.

Figure 29:
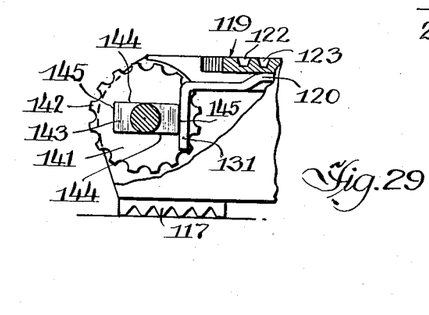
Figure 29 is a fragmentary view, partly in elevation and partly in section, showing a modified embodiment of the anvil positioning wheel.

In Figure 29 a modified embodiment of the anvil positioning means is shown. The wheel 141, substituted for wheel 132, is knurled around its entire circumference, as indicated at 142. The wheel 141 does not have any circumferential projection and may be rotated continuously in one direction. The projections 143 on opposite sides of the wheel 141 are shaped rectangularly so as to provide two cam surfaces 144 either of which will engage legs 131 to align clinching surface 122 vertically with the exit channel, and two cam surfaces 145 which will align clinching surface 123 with the exit channel.

Although I have described a preferred embodiment of my invention in considerable detail, it will be understood that the description thereof is intended to be illustrative rather than restrictive, as many changes may be made in the structure described without departing from the spirit or scope of the invention. Accordingly, I do not desire to be restricted to the exact structure described, except as limited by the appended claims.

I claim:

1. In a stapling machine, an exit channel, a driver for driving staples through said exit channel, a staple support slide, a feed plate positioned in said slide, a pair of fingers extending outwardly from said feed plate to engage the legs of staples mounted on said staple support slide, a spring urging said feed plate forwardly to move said staples toward said exit channel, a plate adjacent the forward side of said exit channel, and a pair of projections extending rearwardly from said plate into the area of said exit channel to support the legs of each staple as it is driven through said exit channel.

2. In a stapling machine, a body portion, an exit channel in the forward end of said body portion for driving a staple, a driving blade reciprocable through said channel to drive a staple from said machine, a staple support slide for supporting a plurality of staples, a feed plate for moving staples from said slide successively into the path of said driving blade, and a vertical plate fixedly positioned in a plane adjacent the plane of said driving blade, said vertical plate having a forwardly extending lip engaging said body portion to prevent downward movement of said plate and projections extending rearwardly from its lateral edges to form side walls for said exit channel, said projections engaging the legs of a staple being driven through said exit channel.

3. In a stapling machine, a body portion, an exit channel in the forward end of said body portion for driving a staple, a ram, a driving blade secured to said ram and reciprocable through said exit channel to drive a staple from said machine, a staple support slide for supporting a plurality of staples at right angles to said exit channel with the foremost staple aligned with said exit channel, said driving blade engaging said foremost staple and driving it through said exit channel upon downward movement of said ram, a fixed vertical plate engaging one face of said driving blade, a lip extending forwardly from the upper edge of said plate and engaging said body portion to prevent downward movement of said plate, a pair of projections extending rearwardly from the lateral edges of said vertical plate to engage the legs of the staple being driven through said channel, and a spring pressed feed plate urging said staples toward said channel.

4. In a stapling machine, a body portion, a driving blade, a staple support slide for supporting a plurality of staples urged forwardly to position the foremost staple under said driving blade, and a plate having projections extending rearwardly to support the legs of a staple being driven and a lip extending forwardly, said lip engaging said body portion to prevent downward movement of said plate.

5. In a stapling machine, a body portion, a driving blade, a staple support slide for supporting a plurality of staples urged forwardly to position the foremost staple under said driving blade, and a plate engaging one face of the lower portion of said driving blade and the corresponding face of the staple being driven to support said blade and said staple against movement in a forward direction, said plate having a pair of rearwardly extending projections to support the legs of said staple and a forwardly extending lip engaging said body portion to support said plate against downward movement during the stapling operation.

6. In a stapling machine, a body portion, a driving blade, a staple support slide for supporting a plurality of staples urged forwardly to position the foremost staple under said driving blade, and a plate, said plate having a forwardly extending lip engaging said body portion to support said plate against downward movement and having rearwardly extending projections spaced apart a distance substantially equal to the overall width of said staples to receive the legs of said foremost staple therebetween, said projections co-operating with said plate to support the legs of said foremost staple during the stapling operation.

7. In a stapling machine, a body portion, a driving blade reciprocable in the forward end of said body portion, a supporting bracket mounted in said forward end with one plate in a plane parallel to and adjacent the plane of said driving blade and a lip extending forwardly at right angles to said plate, and a rod positioned underneath said lip and bearing against the forward face of said plate to hold said bracket against forward movement during the staple driving operation.

8. In a stapling machine, a body portion, a driving blade reciprocable in the forward end of said body portion, a supporting bracket mounted in said forward end with one plate in a plane parallel to and adjacent the plane of said driving blade, a lip projecting forwardly at right angles to the upper edge of said plate, a pair of projections extending rearwardly from said plate into the plane of said driving blade, said projections being spaced apart a distance substantially equal to the overall width of a staple driven by said driving blade to support said staple during the driving operation, and a rod positioned below said lip and bearing against the forward face of said plate to hold said bracket against forward movement during the staple driving operation.

9. In a stapling machine, a body portion, a driving blade movable downwardly through said body portion to drive a staple from said machine, a plate positioned in a plane parallel to and adjacent the plane of said blade for preventing forward movement of the staple being driven, the vertical edges of said plate extending rearwardly to form a guide for the staple during the driving operation, a recess in said body portion, and a thrust bearing in said recess, said thrust bearing engaging the forward face of said plate to hold said plate against forward movement during the staple driving operation.

10. In a stapling machine, a body portion; a thrust bearing mounted in said body portion, a driving blade movable downwardly through said body portion to drive a staple from said machine, and a plate having a lip overlying said bearing, said plate being positioned in a plane contiguous to said bearing and said blade, said plane being parallel to the plane of said blade for preventing forward movement of the staple being driven, said bearing preventing forward movement of said plate during the staple driving operation, the vertical edges of said plate extending rearwardly to form a guide for the staple during the driving operation, the lateral distance between said rearwardly extending edges being substantially equal to the overall width of the staple being driven, whereby the legs of said staple are supported against movement in an outward direction during its downward movement through the machine.

11. In a stapling machine, an exit channel for driving a staple, a driving blade reciprocable in said exit channel to drive a staple therethrough, a supporting bracket having a vertical plate parallel to and adjacent the forward side of said exit channel and a lip projecting forwardly at right angles to the upper edge of said plate, said vertical plate being wider than said driving blade, the vertical edges of said vertical plate extending rearwardly into said exit channel a distance equal to the thickness of the staple, the lateral distance between said rearwardly extending edges being equal to the overall width of the staple, whereby the staple is supported by said vertical plate and said rearwardly extending edges during the staple driving operation, and a rod positioned under said lip and bearing against the forward surface of said vertical plate to hold said bracket against forward movement during the staple driving operation.

12. In a stapling machine, a driving blade movable downwardly to drive a staple from said machine, a plate positioned parallel to and adjacent the plane of said blade, a pair of projections extending rearwardly from said plate a distance substantially equal to the thickness of the staple to be driven, said projections extending vertically along said plate and spaced apart laterally a distance substantially equal to the overall width of the staple to be driven, a lip extending forwardly from said plate, and a thrust bearing positioned under said lip, said bearing engaging said plate to prevent forward movement of said plate during the staple driving operation.

13. In a stapling machine, a body portion, a driving blade reciprocable in the forward end of said body portion, a bracket mounted in the forward end of said body portion, said bracket including a vertical plate in a plane parallel to and adjacent the plane of said driving blade, a pair of vertically spaced recesses in said body portion forwardly of the plane of said driving blade, a transversely extending rod mounted in each of said recesses, one of said rods bearing directly against the upper portion of said driving blade, said other rod bearing against said vertical plate which in turn bears against the lower portion of said driving blade, and a pair of projections on said vertical plate to support the legs of a staple during the staple driving operation.

14. In a stapling machine, a body portion, an exit channel in the forward end of said body portion, a driving blade reciprocable in said exit channel to drive a staple therethrough, a plate mounted in a plane parallel to and adjacent said exit channel, the vertical edges of said plate extending rearwardly into said exit channel a distance equal to the thickness of the staple to be driven to support the legs of said staple during the staple driving operation, a recess in said body portion forwardly of said plate, and a transversely extending rod mounted in said recess and bearing against the forward surface of said plate to prevent forward movement of said plate during the staple driving operation.

15. In a stapling machine, a body portion, an exit channel in the forward end of said body portion, a ram, a driving blade rigidly secured to the front surface of said ram and reciprocable through said exit channel to drive a staple therethrough, a vertical plate parallel to and adjacent the plane of said driving blade, the edges of said plate extending rearwardly into said exit channel to support the legs of said staples during the staple driving operation, a bearing member bearing against the forward surface of said vertical plate to prevent forward movement of said vertical plate during the staple driving operation, a latch engaging the rear vertical surface of said ram, a stop plate engageable with said latch to prevent upward movement of said ram, and a shield actuated by said latch upon completion of a full downward stroke of said ram to render said stop plate inoperative.

16. In a stapling machine, a body portion, an exit channel in the forward end of said body portion, a ram, a driving blade rigidly secured to the front surface of said ram and reciprocable through said exit channel to drive a staple therethrough, a vertical plate parallel to and adjacent the plane of said driving blade, the edges of said plate extending rearwardly into said exit channel to support the legs of said staples during the staple driving operation, a latch engaging the rear vertical surface of said ram, a stop plate engageable with said latch to prevent upward movement of said ram, and a shield actuated by said latch upon completion of a full downward stroke of said ram to render said stop plate inoperative.

17. In a stapling machine, a ram movable downwardly to eject a staple from said machine, a latch engaging one vertical surface of said ram, a stop member engageable with said latch to prevent upward movement of said ram, and a shield actuated by said latch to render said stop member inoperative after the ram has been moved through a complete downward stroke.

18. In a stapling machine, a ram, a latch, a stop member engaging said latch, when not shielded, to prevent upward movement of said ram, and a shield movable out of shielding position upon the initiation of the downward stroke of said ram and movable into shielding position only after the completion of said downward stroke.

19. In a stapling machine, a ram, a projection extending outwardly from the rear of said ram, a latch movable over said projection during the downward movement of said ram, a shield pivoted to said ram above said projection and movable upwardly about its pivot by said latch during a portion of the downward movement of said ram, said latch clearing said shield at the completion of the downward stroke of said ram, said shield dropping into shielding position when free of engagement with said latch to enable said latch to ride over said shield past said projection in the reverse direction during the upward movement of said ram.

20. In a stapling machine, a ram, a projection extending rearwardly from said ram, a latch movable over said projection during the downward movement of said ram, said latch engaging said projection to prevent upward movement of said ram to its original position until after said ram has completed its downward stroke.

21. In a stapling machine, a ram, a driving blade secured to the front of said ram and operable upon downward movement of said ram to drive a staple from said machine, a stop plate secured to the rear surface of said ram, said stop plate having an aperture therein, a lip projecting outwardly from the lower edge of said aperture, and a horizontally disposed latch having its forward edge yieldingly urged against the rear surface of said ram and lying in a plane below said lip before the start of a staple driving operation, said latch riding over said lip as said ram is moved downwardly and engaging said lip to prevent upward movement of said ram to its original position until after the downward stroke of said ram is completed.

22. In a stapling machine, a staple support slide, an exit channel adjacent the forward edge of said slide, a ram, a driving blade secured to the front of said ram and operable upon downward movement of said ram to drive the foremost staple from said staple support slide through said exit channel, a stop plate secured to the rear surface of said ram, said stop plate having an aperture therein, a lip projecting outwardly from the lower edge of said aperture, and a horizontally disposed latch having its forward edge yieldingly urged against the rear surface of said ram and lying in a plane below said lip before the start of a staple driving operation, said latch riding over said lip as said ram is moved downwardly and engaging said lip to prevent upward movement of said driving blade to clear said exit channel until said foremost staple is ejected from said machine.

23. In a stapling machine, a staple support slide, an exit channel adjacent the forward edge of said slide, a ram, a driving blade secured to the front of said ram and operable upon downward movement of said ram to drive the foremost staple from said staple support slide through said exit channel, a stop plate secured to the rear surface of said ram, said stop plate having an aperture therein, a lip projecting outwardly from the lower edge of said aperture, a shield pivotally secured to said ram and traversing said aperture, and a horizontally disposed latch having its forward edge yieldingly urged against the rear surface of said ram and lying in a plane below said lip before the start of a staple driving operation, said latch successively riding over said lip, moving said shield about its pivot, and then riding over said shield during the downward stroke of said ram, said driving blade ejecting said staple from said exit channel before said latch clears said shield, said shield being movable in the reverse direction as soon as it is cleared by said latch, whereby said shield acts as a cam to permit said latch to ride over said lip during the upward movement of said ram, said lip engaging said latch to stop upward movement of said ram until said ram has moved downwardly far enough to cause said latch to clear said shield.

24. In a stapling machine, a staple support slide, an exit channel adjacent the forward edge of said staple support slide, a ram, a driving blade secured to the front of said ram and operable upon downward movement of said ram to drive the foremost staple from said staple support slide through said exit channel, a stop member secured to said ram, and a latch having one end engaging said ram adjacent said stop member, said latch engaging said stop member to prevent full upward movement of said ram unless said upward movement is preceded by a complete downward stroke.

25. In a stapling machine, a staple support slide having a pair of side walls adapted to fit between the legs of a staple, a longitudinally extending slot in each side wall, said slots stopping short of the rear edge of said side walls, a spring pressed feed plate mounted between said side walls, and a pair of feed fingers pivotally mounted in said feed plate, said feed fingers being spring pressed outwardly and normally projecting through said slots, the rear ends of said slots being effective to collapse said feed fingers upon rearward pressure on said feed plate when said fingers are engaged with the rear ends of said slots to permit loading a plurality of staples on said staple support slide by positioning said staples on the rear of said staple support slide and moving them forwardly with their legs straddling said side walls.

26. In a stapling machine, a staple support slide having a pair of side walls adapted to fit between the legs of a staple, a longitudinally extending slot in each side wall, said slots stopping short of the rear edge of said side walls, and a spring pressed feed plate mounted between said side walls, said feed plate including a pair of feed fingers projecting through said slots, the rear ends of said slots being effective to collapse said feed fingers upon rearward pressure on said feed plate when said fingers are engaged with the rear ends of said slots to permit loading a plurality of staples on said staple support slide by positioning said staples on the rear of said staple support slide and moving them forwardly by gravity with their legs straddling said side walls.

27. In a stapling machine, a staple support slide having a pair of side walls adapted to fit between the legs of a staple, a longitudinally extending slot in each side wall, said slots stopping short of the rear edge of said side walls, a spring pressed feed plate mounted in said slide, and a pair of feed fingers projecting from said feed plate through said slots, the rear ends of said slots being effective to collapse said feed fingers upon rearward pressure on said feed plate when said fingers are engaged with the rear ends of said slots to permit loading or unloading a plurality of staples from the rear end of said staple support slide.

HERBERT W. MARANO.

References Cited in the file of this patent

UNITED STATES PATENTS

| Number | Name | Date |
| --- | --- | --- |
| 853,393 | Albaugh | May 14, 1907 |
| 1,787,285 | Polzer | Dec. 30, 1930 |
| 1,935,280 | Vogel | Nov. 14, 1933 |
| 1,943,661 | Ellacott | Jan. 16, 1934 |
| 2,073,960 | Crosby | Mar. 16, 1937 |
| 2,087,242 | Bunnell | July 20, 1937 |
| 2,107,169 | Weber | Feb. 1, 1938 |
| 2,117,741 | Polzer | May 17, 1938 |
| 2,117,743 | Polzer | May 17, 1938 |
| 2,227,826 | Drypolcher | Jan. 7, 1941 |
| 2,267,719 | Crosby | Dec. 30, 1941 |
| 2,271,926 | Pankonin | Feb. 3, 1942 |
| 2,281,198 | Maynard | Apr. 28, 1942 |
| 2,300,277 | Hansen | Oct. 27, 1942 |
| 2,310,529 | Kantz | Feb. 9, 1943 |
| 2,408,563 | Lang | Oct. 1, 1946 |
| 2,461,165 | Lindstrom | Feb. 8, 1949 |
| 2,472,032 | Wandel | May 31, 1949 |
| 2,537,438 | Berger | Jan. 9, 1951 |

FOREIGN PATENTS

| Number | Country | Date |
| --- | --- | --- |
| 446,389 | Great Britain | Apr. 29, 1936 |